(12) United States Patent
Lyon et al.

(10) Patent No.: US 7,362,372 B2
(45) Date of Patent: Apr. 22, 2008

(54) VIDEO SURVEILLANCE CAMERA

(75) Inventors: Thomas Lyon, Clovis, CA (US); Alex Pokrovsky, Fresno, CA (US); Erik Tews, Fresno, CA (US); Mark J. Johnson, Livermore, CA (US)

(73) Assignee: Pelco, Clovis, CA (US)

( * ) Notice: Subject to any disclaimer, the term of this patent is extended or adjusted under 35 U.S.C. 154(b) by 709 days.

(21) Appl. No.: 10/942,753

(22) Filed: Sep. 16, 2004

(65) Prior Publication Data
US 2006/0055820 A1   Mar. 16, 2006

(51) Int. Cl.
*H04N 5/225* (2006.01)
(52) U.S. Cl. .................. 348/373; 348/374; 348/151
(58) Field of Classification Search ......... 348/373–376
See application file for complete search history.

(56) References Cited

U.S. PATENT DOCUMENTS 4,547,809 A * 10/1985 Southgate .................. 348/374
6,151,065 A * 11/2000 Steed et al. ................. 348/148
6,847,403 B1 * 1/2005 Forsberg et al. ............ 348/373
7,278,268 B2 * 10/2007 Quarre .......................... 62/3.2
2004/0195676 A1 * 10/2004 Quarre ........................ 257/713
2006/0171704 A1 * 8/2006 Bingle et al. ............... 396/419

* cited by examiner

*Primary Examiner*—David Ometz
*Assistant Examiner*—Pritham Prabhakher
(74) *Attorney, Agent, or Firm*—Paul T. Kashimba, Esq.

(57) ABSTRACT

A video surveillance camera comprising an image sensor, first housing, second housing, electronic circuit, and thermal barrier. The image sensor is located in the first housing, and the electronic circuit is located in the second housing. The thermal barrier has first and second sides with the first side located adjacent to the first housing and the second side located adjacent to the second housing. The image sensor and other electronics, such as the processor board associated with the image sensor or the camera power supply, are located in separate housings or chambers that are separated and insulated from each other by a thermal barrier, thereby minimizing the heat generated by the processor electronics or power supply from being transferred to the area of the image sensor.

12 Claims, 4 Drawing Sheets

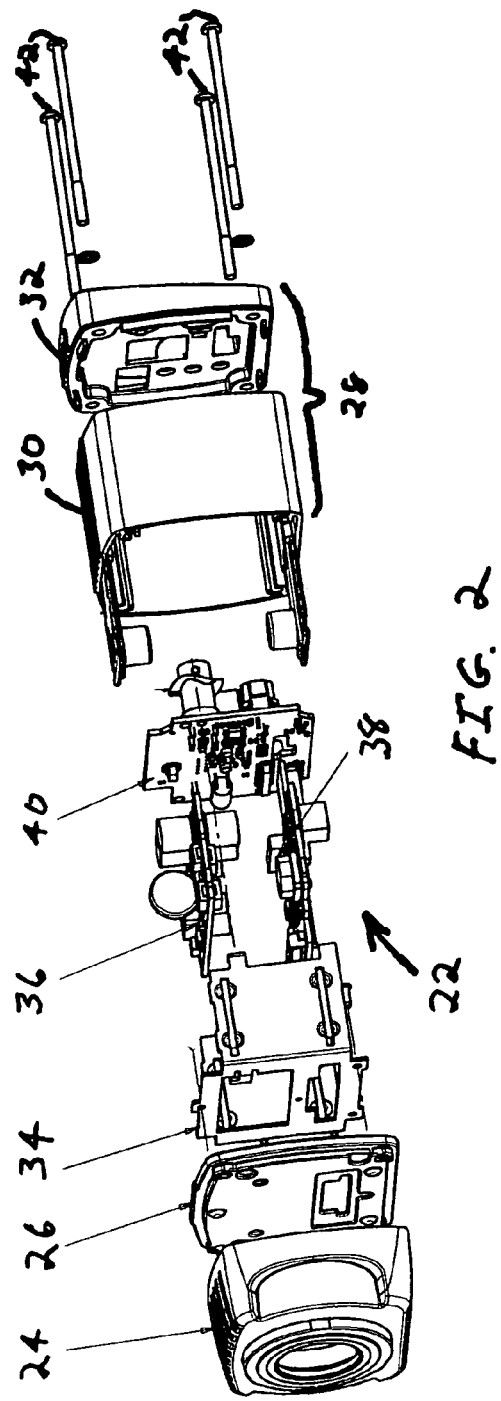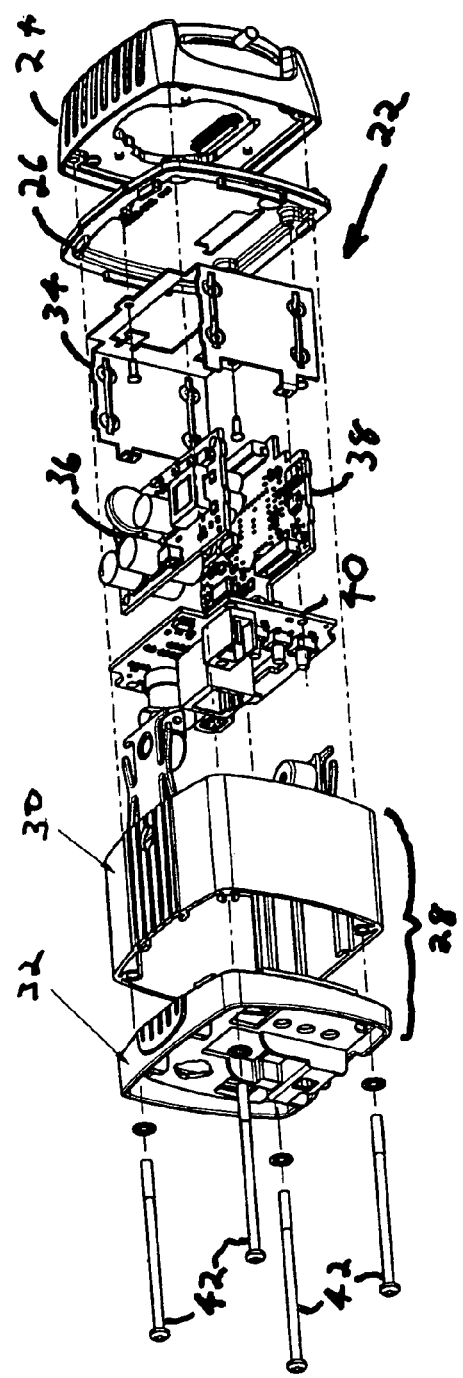

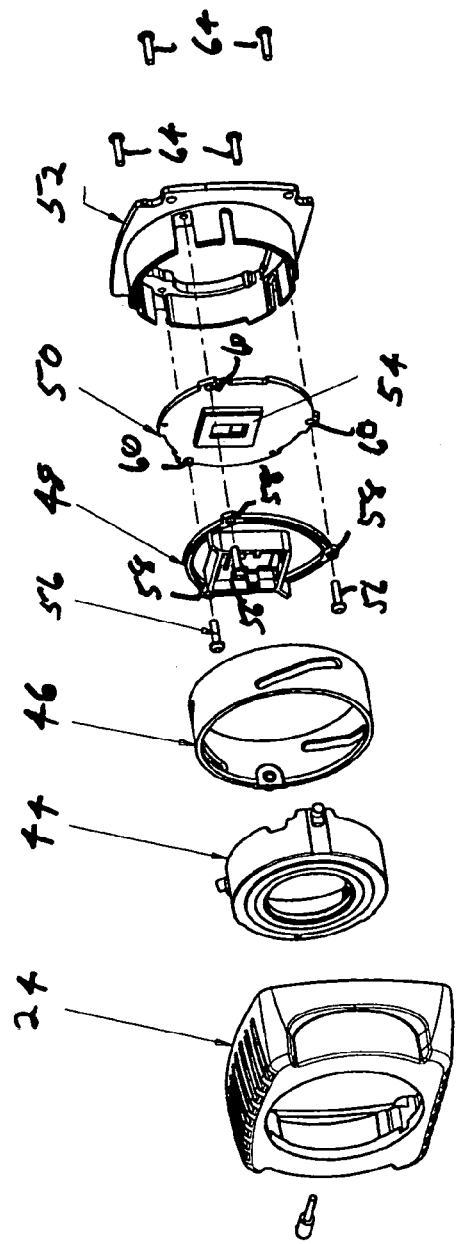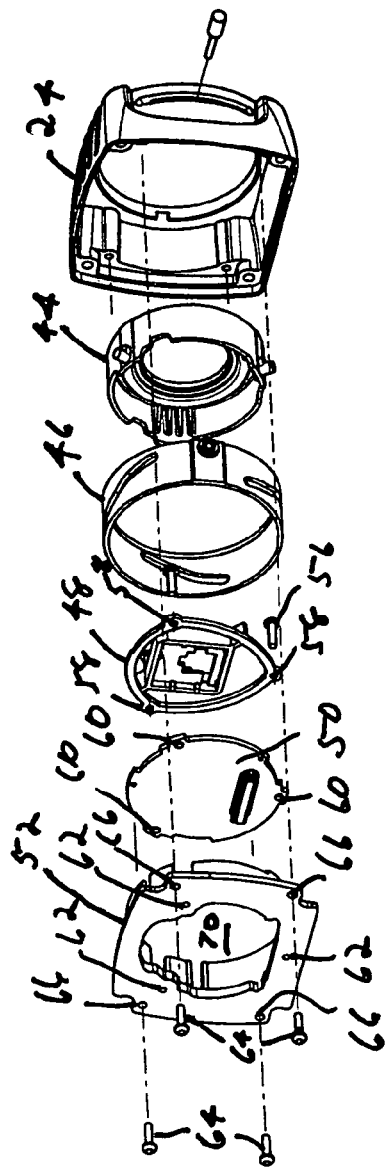

VIDEO SURVEILLANCE CAMERA

CROSS-REFERENCE TO RELATED APPLICATION

N/A

STATEMENT REGARDING FEDERALLY SPONSORED RESEARCH OR DEVELOPMENT

N/A

BACKGROUND OF THE INVENTION

The present invention relates to video surveillance cameras and, more particularly, to a video surveillance camera having a housing structure that minimizes heat in the area of the image sensor.

Video surveillance cameras must be able to provide clear and distinct images since such images may be used for security, evidentiary, identification, or other similar purposes. Image sensors, such as complementary metal oxide semiconductor (CMOS) image sensors used in video surveillance camera are sensitive to temperature. Heat can distort the video signal produced by such sensors. The undesirable heat may be generated by the image sensor itself or by other components in the camera, such as the processor board for the image sensor or the camera power supply. The heat generated by the other camera components can be transferred to the image sensor location through conduction and radiation. The elevated temperature can result in noise being introduced into the video signal.

Known methods of enhancing heat management include the use of fans, Peltier cells, and thermoelectric coolers. However, each of these solutions requires that additional components or parts be incorporated into the camera, which results in additional costs and design issues with respect to the limited availability of space in the surveillance system camera. Moreover, these additional components are subject to failure, thereby adding to the maintenance of the camera, and may create noise themselves. Accordingly, it is desirable to provide a video surveillance camera that passively minimizes both the heat buildup in the area of the image sensor and the heat transferred to the area of the image sensor from other components in the camera system, thereby providing a camera that has an improved video signal without increasing the cost of the camera or its size.

SUMMARY OF THE INVENTION

In accordance with the present invention there is provided a video surveillance camera comprising an image sensor, first housing, second housing, electronic circuit, and thermal barrier. The image sensor is located in the first housing, and the electronic circuit is located in the second housing. The thermal barrier has first and second sides with the first side located adjacent to the first housing and the second side located adjacent to the second housing. The image sensor and other electronics, such as the processor board associated with the image sensor or the camera power supply, are located in separate housings or chambers that are separated and insulated from each other by a thermal barrier, thereby minimizing the heat generated by the processor electronics or power supply from being transferred to the area of the image sensor.

Various embodiments of the present invention include additional heat minimizing aspects of the design. The thermal barrier can have small raised areas that minimize the physical contact between the first housing and the thermal barrier. Guides through the second housing or chamber minimize contact with the fasteners that secure the camera together. These guides can extend out and away from the walls of the housing to minimize heat transfer to the fasteners. In addition, the guides can be cylindrical with a portion of the cylinder missing to further reduce any heat transfer to the fasteners. Moreover, the fasteners can be thermally insulated, for example, by being nylon coated.

In still other embodiments of the present invention, heat transfer to the image sensor area is reduced by providing raised areas on the thermal barrier to minimize contact between the thermal barrier and the first housing. In addition, the back focus assembly is attached to the first housing such that there is an air gap between the back focus assembly and the first side of the thermal barrier.

The present provides a video surveillance camera that passively minimizes both the heat buildup in the area of the image sensor and the heat transferred to the area of the image sensor from other components in the camera system. To minimize heat transfer to the image sensor, the present invention uses a two chamber housing separated by a thermal barrier with the heat generating circuit boards, such as the power supply and processor board for the image sensor, located as far away from the image sensor as possible in a separate chamber that is insulated by a thermal barrier. The present invention isolates the heat sources so that the heat generated by the image sensor is dissipated by its chamber housing, and the heat generated by the circuit boards is dissipated by their chamber housing.

In addition, the present invention uses an air barrier between the back focus assembly and the thermal barrier to further minimize heat transfer from the circuit boards. The thermal barrier also has raised areas where the housing for the back focus assembly touches the thermal barrier to minimize the area of contact. Still further, the camera of the present invention uses innovative guides in the housing body to minimize the transfer of heat to the screws that secure the camera together.

Accordingly, the passive heat management system of the camera of the present invention provides a camera that has an improved video signal without increasing the cost of the camera or its size in minimizing heat in the area of the image sensor.

Other advantages and applications of the present invention will be made apparent by the following detailed description of the preferred embodiment of the invention.

BRIEF DESCRIPTION OF THE SEVERAL VIEWS OF THE DRAWINGS

FIG. 2 is an exploded front perspective view of the video surveillance camera of the present invention.

FIG. 3 is an exploded back perspective view of the video surveillance camera of the present invention.

FIG. 5 is an exploded front perspective view of the back focus assembly of the present invention.

FIG. 6 is an exploded back perspective view of the back focus assembly of the present invention.

DETAILED DESCRIPTION OF THE INVENTION

Figure 1:
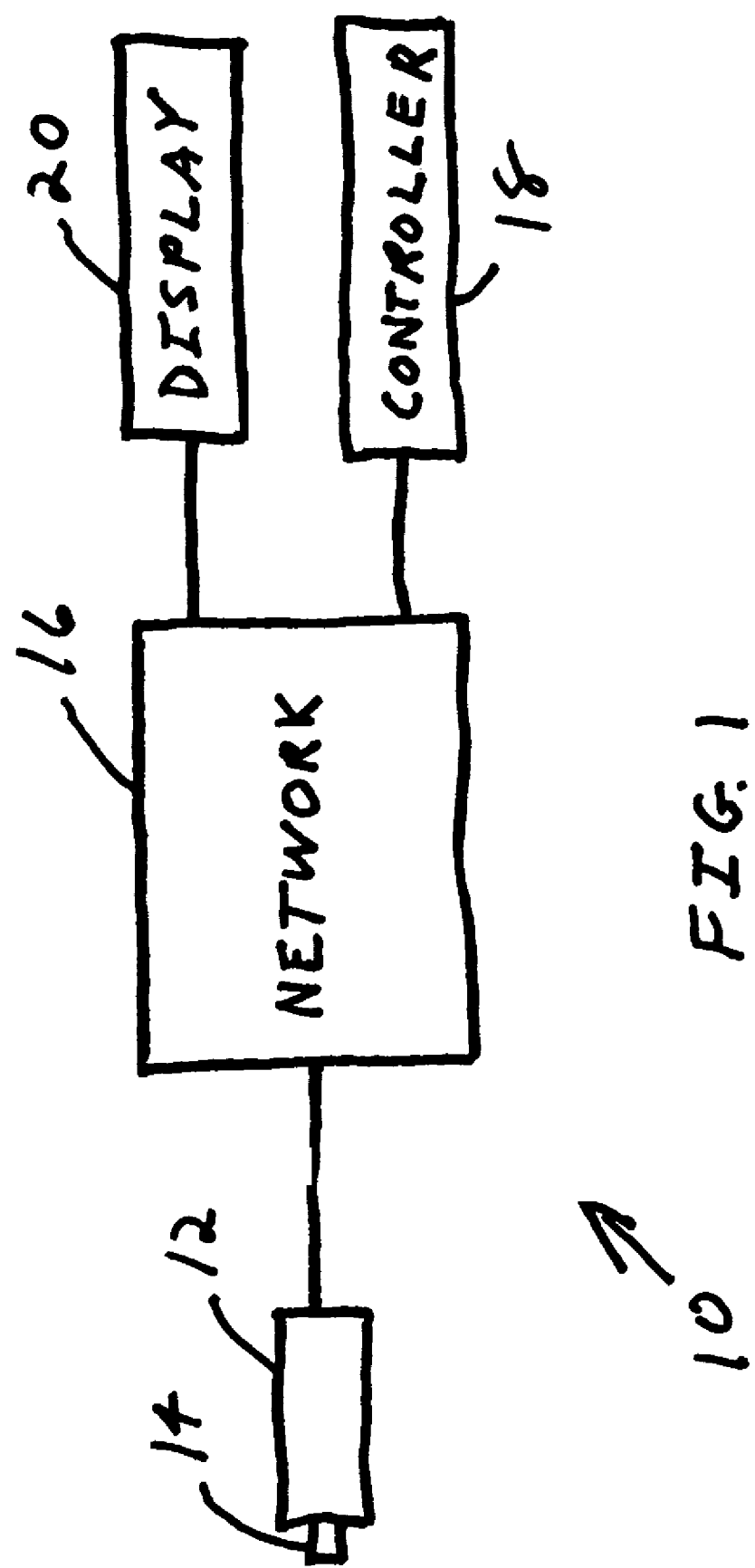
FIG. 1 is schematic block diagram of a video surveillance system utilizing the present invention.

Referring to FIG. 1, a video surveillance system 10 utilizing the present invention is shown in block diagram form. Video surveillance system 10 comprises a camera 12 having a lens 14. Camera 12 is connected to network 16, which can be a closed network, local area network or wide area network, such as the Internet. A controller 18 is connected to network 16 to control video surveillance system 10 as is known in the art. The video images captured by camera 12 can be viewed by the user on display 20. Video surveillance system 10 can comprise a plurality of video cameras, video recorders, and other surveillance devices as is known in the art.

Referring to FIGS. 2 and 3, a video surveillance camera 22 has a first housing 24, thermal barrier 26, and second housing 28. First housing 24 contains a back focus assembly which is discussed in detail with reference to FIGS. 5-7. Second housing 28 consists of body 30 and rear case 32. Chassis 34 is positioned inside second housing 28 and holds power supply board 36, processor board 38, and input/output board 40. Power supply board 36 and processor board 38 normally generate a significant amount of heat as is known in the art. Screws 42 are inserted through apertures in rear case 32 and mate with threaded apertures in the back of first housing 24 to securely fasten video surveillance camera 22 together.

Figure 4:
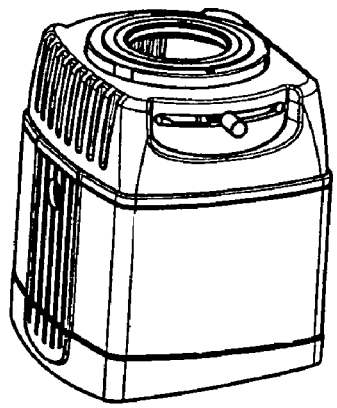
FIG. 4 is a perspective front view of a video surveillance camera utilizing the present invention.

Thermal barrier 26 should be constructed of material that has a low thermal conductivity so that it acts as a thermal insulator to prevent heat from the circuit boards in second housing 28 from being transferred to the image sensor in the back focus assembly in first housing 24. One such material without limitation is polycarbonate and the like. Another embodiment can include dual-pane glass having air between the glass panes as an insulator and other suitable arrangements. Screws 42 can be nylon coated, or provided with other insulating material, to minimize the transfer of heat from power supply board 36, processor board 38, and input/output board 40 in second housing 28 through screws 42 to first housing 24. FIG. 4 shows video surveillance camera 22 fully assembled.

Figure 7:
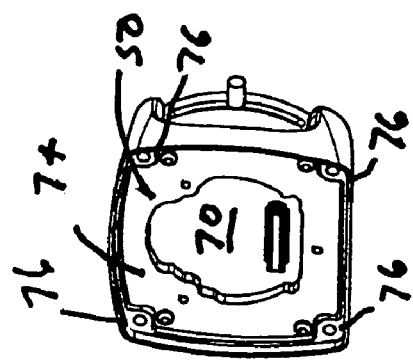
FIG. 7 is a back perspective view of the back focus assembly of the present invention.
Figure 8:
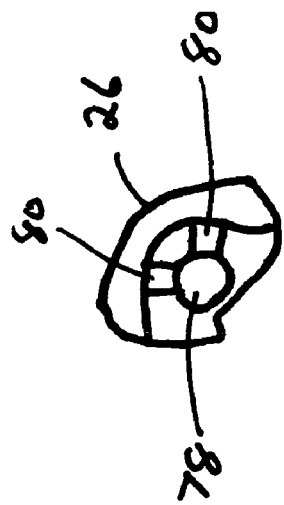
FIG. 8 is a partial front view of the thermal barrier of the present invention.

FIGS. 5 and 6 show the back focus assembly of the present invention in detail. The back focus assembly comprises lens holder 44, adjustment ring 46, filter 48, imager board 50, and base 52. Imager board 50 has an image sensor 54 mounted thereon which senses the image viewed by camera 12. Image sensor 54 can be a complementary metal oxide semiconductor (CMOS) sensor or other suitable sensor. Filter 48 and imager board 50 are rigidly attached to base 52 by screws 56 which pass through apertures 58 of filter 48, apertures 60 of imager board 50 and mate with threaded apertures 62 in base 52. Base 52 in turn is rigidly attached to first housing 24 by screws 64 that pass through apertures 66 in base 52 and mate with threaded apertures 68 in first housing 24. Base 52 has an aperture 70 that is positioned adjacent imager board 50 opposite the location where image sensor 54 is mounted to allow heat generated by image sensor 54 to escape through aperture 70. FIG. 7 shows a back perspective view of the back focus assembly inside first housing 24. This view shows that there is an air gap between flat portion 74 of base 52 and thermal barrier 26 when first housing is adjacent thermal barrier 26 because of raised aperture areas 76. FIG. 8 shows the upper right-hand portion (as viewed from a front view) of thermal barrier 26 as an example of the four corner portions of thermal barrier 26. This area includes aperture 78 through which screw 42 passes. Above aperture 78 and to the right of aperture 78 are raised areas 80 to minimize the contact between thermal barrier 26 and first housing 24, thereby minimizing the heat transferred from second housing 28 through thermal barrier 26 to first housing 24. Different configurations can be used for raised areas 80 and meet the criteria of minimal contact area between thermal barrier 26 and first housing 24. Raised areas 80 may have, for example, of 0.5 millimeter.

Figure 9:
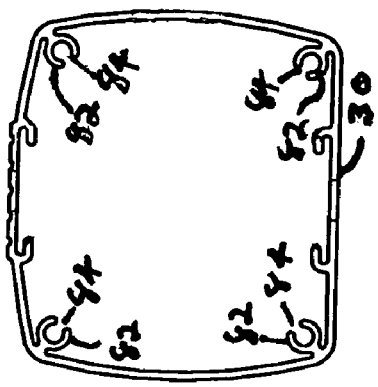
FIG. 9 is a front view of a portion of the camera housing of the present invention.

Referring to FIG. 9, body 30 has guides 82 which are cylindrically shaped and guide screws 42 through body 30. Guides 82 extend out and away from the walls of body 30 to minimize the transfer of any heat in the walls of body 30 to screws 42. In addition, guides 82 have apertures 84 so that a portion of the cylinder is missing to further minimize heat transfer to screws 42.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A video surveillance camera comprising: an image sensor; a first housing, said image sensor being located in said first housing; a second housing; an electronic circuit located in said second housing; and a thermal barrier having a first side located adjacent said first housing and a second side located adjacent said second housing wherein said first housing, thermal barrier and second housing are connected together by a plurality of fasteners and said second housing has a plurality of guides having minimal surface area for making physical contact with said fasteners, wherein said second housing has walls and said guides extend out and away from said walls of said second housing and wherein said guides have a cylindrical shape with a portion of the cylinder missing.

2. A video surveillance camera as recited in claim 1 wherein said fasteners are thermally insulated.

3. A video surveillance camera as recited in claim 2 wherein said fasteners are coated with nylon.

4. A video surveillance camera as recited in claim 1 wherein said first housing, thermal barrier, and second housing are connected together by a plurality of fasteners and said thermal barrier has apertures for said fasteners to pass through and raised areas adjacent said apertures on said first side so that said first housing only touches said first side of said thermal barrier at said raised areas.

5. A video surveillance camera as recited in claim 4 wherein said raised areas are adjacent to said apertures.

6. A video surveillance camera as recited in claim 1 further comprising a back focus assembly attached to said first housing such that there is an air space between said back focus assembly and said first side of said thermal barrier.

7. A video surveillance camera as recited in claim 6 wherein said imager board has an image sensor mounted on a first side of said board, a second side of said board is adjacent said base, and said base has an aperture that is positioned adjacent said second side of said board opposite the location where said image sensor is mounted on said first side of said board.

8. A video surveillance camera as recited in claim 7 wherein said fasteners are thermally insulated.

9. A video surveillance camera as recited in claim 8 wherein said electronic circuit comprises a power supply.

10. A video surveillance camera comprising: an image sensor; a first housing, said image sensor being located in said first housing; a second housing; an electronic circuit located in said second housing; and a thermal barrier having a first side located adjacent said first housing and a second side located adjacent said second housing and further comprising a back focus assembly attached to said first housing such that there is an air space between said back focus assembly and said first side of said thermal barrier.

11. A video surveillance camera as recited in claim 10 wherein said back focus assembly comprises an imager board and base and said back focus is assembled to minimize the contact between said imager board and said base.

12. A video surveillance camera as recited in claim 11 wherein said imager board has an image sensor mounted on a first side of said board, a second side of said board is adjacent said base, and said base has an aperture that is positioned adjacent said second side of said board opposite the location where said image sensor is mounted on said first side of said board.

* * * * *